US00RE34838E

United States Patent [19]

Mohri et al.

[11] E Patent Number: Re. 34,838

[45] Reissued Date of Patent: Jan. 31, 1995

[54] PERMANENT MAGNET AND METHOD FOR PRODUCING SAME

[75] Inventors: Kaneo Mohri; Jiro Yamasaki, both of Fukuoka, Japan

[73] Assignee: TDK Corporation, Tokyo, Japan

[21] Appl. No.: 572,568

[22] Filed: Aug. 23, 1990

Related U.S. Patent Documents

Reissue of:

[64] Patent No.: 4,765,848
Issued: Aug. 23, 1988
Appl. No.: 814,183
Filed: Dec. 27, 1985

[30] Foreign Application Priority Data

| | | | |
|---|---|---|---|
| Dec. 31, 1984 | [JP] | Japan | 59-280125 |
| Sep. 17, 1985 | [JP] | Japan | 60-205004 |
| Sep. 17, 1985 | [JP] | Japan | 60-205005 |
| Sep. 17, 1985 | [JP] | Japan | 60-205006 |
| Nov. 21, 1985 | [JP] | Japan | 60-259816 |

[51] Int. Cl.[6] ..... H01F 1/04

[52] U.S. Cl. ..... 148/302; 420/83; 420/121

[58] Field of Search ..... 148/302; 420/83, 121

[56] References Cited

U.S. PATENT DOCUMENTS

| | | | |
|---|---|---|---|
| 4,402,770 | 9/1983 | Koon | 148/302 |
| 4,533,408 | 8/1985 | Koon | 148/103 |
| 4,558,077 | 12/1985 | Gray | 523/458 |
| 4,721,538 | 1/1988 | Narasimhan et al. | 148/302 |

FOREIGN PATENT DOCUMENTS

| | | | |
|---|---|---|---|
| 0101552 | 2/1984 | European Pat. Off. . | |
| 0106948 | 5/1984 | European Pat. Off. . | |
| 55-24909 | 2/1980 | Japan | 420/435 |
| 58-123853 | 7/1983 | Japan . | |
| 59-46008 | 3/1984 | Japan . | |
| 59-64733 | 4/1984 | Japan . | |
| 59-64739 | 4/1984 | Japan . | |
| 59-76856 | 5/1984 | Japan . | |
| 59-211549 | 11/1984 | Japan . | |
| 60-145357 | 7/1985 | Japan . | |
| 60-184603 | 9/1985 | Japan | 148/101 |
| 60-194502 | 10/1985 | Japan . | |
| 60-221550 | 11/1985 | Japan . | |
| 60-224757 | 11/1985 | Japan . | |
| 60-224761 | 11/1985 | Japan . | |
| 60-238448 | 11/1985 | Japan . | |
| 61-80805 | 4/1986 | Japan . | |

*Primary Examiner*—John P. Sheehan
*Attorney, Agent, or Firm*—Burgess, Ryan and Wayne

[57] ABSTRACT

In the rare earth-iron-boron permanent magnet, Ce and La decrease the magnetic properties when used alone but synergistically enhance iHc when used in combination.

The composition provided by the present invention is generally expressed by $[(Ce_x La_{1-x})_y R_{1-y}]_2[(Fe_{1-u-w} Co_w M_u)_{1-v} B_v]_{1-z}$ with a proviso of $0.4 \leqq x \leqq 0.9$, $0.2 < y \leqq 1.0$, $0.05 \leqq z \leqq 0.3$, $0.01 \leqq v \leqq 0.3$, $0 \leqq u \leqq 0.2$, $0 \leqq w \leqq 0.5$, and M is at least one element selected from the group consisting of Al, Ti, V, Cr, Mn, Zr, Hf, Nb, Ta, Mo, Ge, Sb, Sn, Bi, Ni, W, Cu, and Ag.

27 Claims, 4 Drawing Sheets

PERMANENT MAGNET AND METHOD FOR PRODUCING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a rare-earth-iron-boron permanent magnet.

2. Description of the Related Art

Recently, permanent magnets containing rare earth, Fe, and, B as the basic components have been closely studied, and the results of these studies have been published in patent documents and the like.

Japanese Unexamined Patent Publication No. 57-141901 discloses a method for producing a permanent magnet powder wherein the composition of a transition group metal (T), metalloid metal (M), and a lanthanoid element (R) is glassified, and the obtained amorphous composition is then crystallized and a coercive force is generated by heat treatment. According to this publication, T is one or more elements selected from Ti, V, Cr, Mn, Fe, Co, Ni, Cu, Zr, Nb, Mo, Hf, Ta, and W; M is one or more elements selected from B, Si, P, and C; and R is one or more elements selected from Y and lanthanoid elements. This publication claims a permanent magnet powder expressed by the formula $(T_{1-x}M_x)_zR_{1-z}$, wherein $0 \leqq x \leqq 0.35$ and $0.35 \leqq z \leqq 0.90$.

Japanese Unexamined Patent Publication No. 58-123853 proposes a La- and Pr-containing material having the composition $(Fe_x\ B_{1-x})_y-(La_zPr_wR_{1-z-w})_{1-y}$, in which R is one or more rare earth elements except for La and Pr, $x=0.75\sim0.85$, $y=0.85\sim0.95$, $z=0.40\sim0.75$, $w=0.25\sim0.60$, and $z+w \leqq 1.0$. According to this publication, the kinds and proportion of rare-earth elements are adjusted to provide the above composition $(La_zPr_wR_{1-z-w})$ so as to attain an appropriate enhancement of the coercive force at the annealing and crystallizing of the rare earth-iron-boron alloy. The coercive force is enhanced at approximately 3 kOe.

Japanese Unexamined Patent Publication No. 59-46008 proposes a magnetically anisotropic sintered body consisting of from 8 to 30 atomic % of R (at least one of the rare earth elements), from 2 to 28 atomic % of B, and Fe in balance. The invention of this publication aims at producing a permanent magnet having a desired shape by the sintering method, since the method of rapid cooling the melt brings about certain limitations in the magnet shape. The above publication discloses, as R, Nd alone, Pr alone, a combination of Nd and Pr, a combination of Nd and Ce, a combination of Sm and Pr, Tb alone, Dy alone, Ho alone, and a combination of Er and Tb.

The above prior art disclose that excellent magnetic properties are obtained for the rare earth-iron-boron magnet, in which the rare earth element is Nd or Pr. In addition, La and Ce are set forth in the claim in the unexamined patent publications as the rare earth elements, but the highest content of La and Ce are limited so as not to incur a reduction in the magnetic properties. There is a substantial absence of disclosure directed to the rare earth-iron-boron permanent magnet, the rare earth components of which are mainly composed of La and Ce. This is further explained with reference to FIG. 1.

Referring to FIG. 1, Pr and Nd as the rare earth components of the rare earth-iron-boron permanent magnet exhibit the best magnetic properties. When La or Ce is used as the rare earth component, the alloy consisting of La or Ce, Fe, and B cannot exhibit the same magnetic properties as the permanent magnet. FIG. 1 teaches that the replacement of Nd, and Pr with La or Ce causes a reduction in the magnetic properties required for the permanent magnet. Based on the teaching of FIG. 1, it can be said that the prior arts explained above teach R-Fe-B alloy which can exhibit the magnetic properties required for the permanent magnet only at a slight replacement of Nd and Pr with La or Ce but not an alloy wherein the rare earth elements are composed mainly or totally of La or Ce.

A recent prominent advancement of the rare earth-iron-boron permanent magnet is disclosed in the publication "DIDYMIUM-Fe-B SINTERED PERMANENT MAGNETS" at MMM on October 1984, which attained a coercive force (iHc) of 10.2 kG and a maximum energy product ((BH) max) of 40MGOe by a magnet consisting of $32.5\sim34.5\%$ of R, $1\sim1.6\%$ of B, and balance of iron, wherein R is (Nd -10% Pr), 5% Ce-didymium, or 40% Ce-didymium. In this permanent magnet, the main rare earth component is also Nd.

Japanese Unexamined Patent Publication No. 60-100402 discloses a method in which melt containing Fe, B, and Nd and/or Pr is rapidly cooled to form amorphous or finely crystalline, solid material, and further, it is subjected to a high-temperature treatment by hot-pressing to form a plastically deformed body having a microstructure formed by fine particles, followed by cooling.

The time duration of the high-temperature treatment and the cooling speed are adjusted to induce a magnetic anisotropy in the resultant permanent magnet body.

One of the drawbacks of the permanent magnet, the main components of which are rare earth elements Fe, and B, is that Nd, or Pr must be the main components of the rare earth elements to attain excellent magnetic properties, and hence the permanent magnet becomes expensive. The permanent magnet containing dydimium is attractive, since the dydimium is inexpensive, and further, the permanent magnet can exhibit magnetic properties comparable to magnets containing Nd and Pr.

If La or Ce can be contained in the rare earth-iron-boron magnet as a main component(s) of the rare earth components, a drastic cost reduction of such a magnet becomes possible, since La and Ce are available in a greater amount than the other rare earth elements and hence are inexpensive. Nevertheless, La and Ce are detrimental to the magnetic properties, as is understood from FIG. 1. The ferromagnetic crystal of the rare earth-iron-boron magnet is an $R_2Fe_{14}B$ compound which becomes unstable or is not at all formed when R is La. When R is Ce although $R(Ce)_2Fe_{14}B$ is formed, the coercive force of this compound becomes low.

As described above, there is a substantial absence of any disclosure in the prior art for replacing Nd, Pr, and the like with a large quantity of La or Ce.

The plastic working method disclosed in Japanese Unexamined Patent Publication No. 60-100,402, i.e., the hot-working method, involves a problem in that: an appropriate temperature for the plastic working is from 700° C. to 850° C. and thus relatively high; the pressure is from 1 to 3 ton/cm$^2$ and relatively high; and, an appropriate pressing time is approximately 5 minutes and thus relatively short. According to this publication, during plastic working of the microstructure material the magnetic anisotropy is induced and the magnetic properties are therefore improved. To improve the magnetic properties, it is crucial to control the plastic working in terms of temperature, pressure, and time in such a manner as mentioned above. Such control is complicated. If the control is unsatisfactory, not only are the desired magnetic properties unobtainable, but also the shape and dimension of the products is restricted, so that products appropriate for various uses cannot be obtained, and this is a drawback in industrial application. If an appropriate temperature for the plastic working becomes low, and if the pressure for the plastic working becomes low, the plastic working method can be broadly applied for the production of various shapes, for example, an extremely thin magnet.

The anisotropic magnet having a radial direction of anisotropy is well known in the field of plastic magnets. The magnetic powder generally used for the radial anisotropic permanent magnet is Sm-Co powder. The rare earth-iron-boron magnet has a drawback that, when pulverized, the coercive force is decreased. Because of this, it has been heretofore difficult to produce a radial anisotropic permanent magnet using the rare earth-iron-boron powder.

SUMMARY OF THE INVENTION

It is an object of the present invention to provide a rare earth-iron-boron magnet free of the drawbacks described above.

In accordance with the present invention, there is provided a permanent magnet having a composition (hereinafter referred to as the "first composition") expressed by $(Ce_xLa_{1-x})_z(Fe_{1-v}B_v)_{1-z}$, with the proviso of $0.4 \leqq x \leqq 0.9$, $0.05 \leqq z \leqq 0.3$, and $0.01 \leqq v \leqq 0.3$, and having a coercive force (iHc) of at least 4 kOe.

There is also provided a permanent magnet having a composition (hereinafter referred to as "the second composition") of $[(Ce_xLa_{1-x})_yR_{1-y}]_z(Fe_{1-v}B_v)_{1-z}$, wherein R is at least one rare earth element except for Ce and La, but including Y, with the proviso of $0.4 \leqq x \leqq 0.9$, $0.2 < y < 1.0$, $0.05 \leqq z \leqq 0.3$, $0.01 \leqq v \leqq 0.3$, and having a coercive force (iHc) of at least 4 kOe.

DESCRIPTION OF THE PREFERRED EMBODIMENTS

Figure 1:
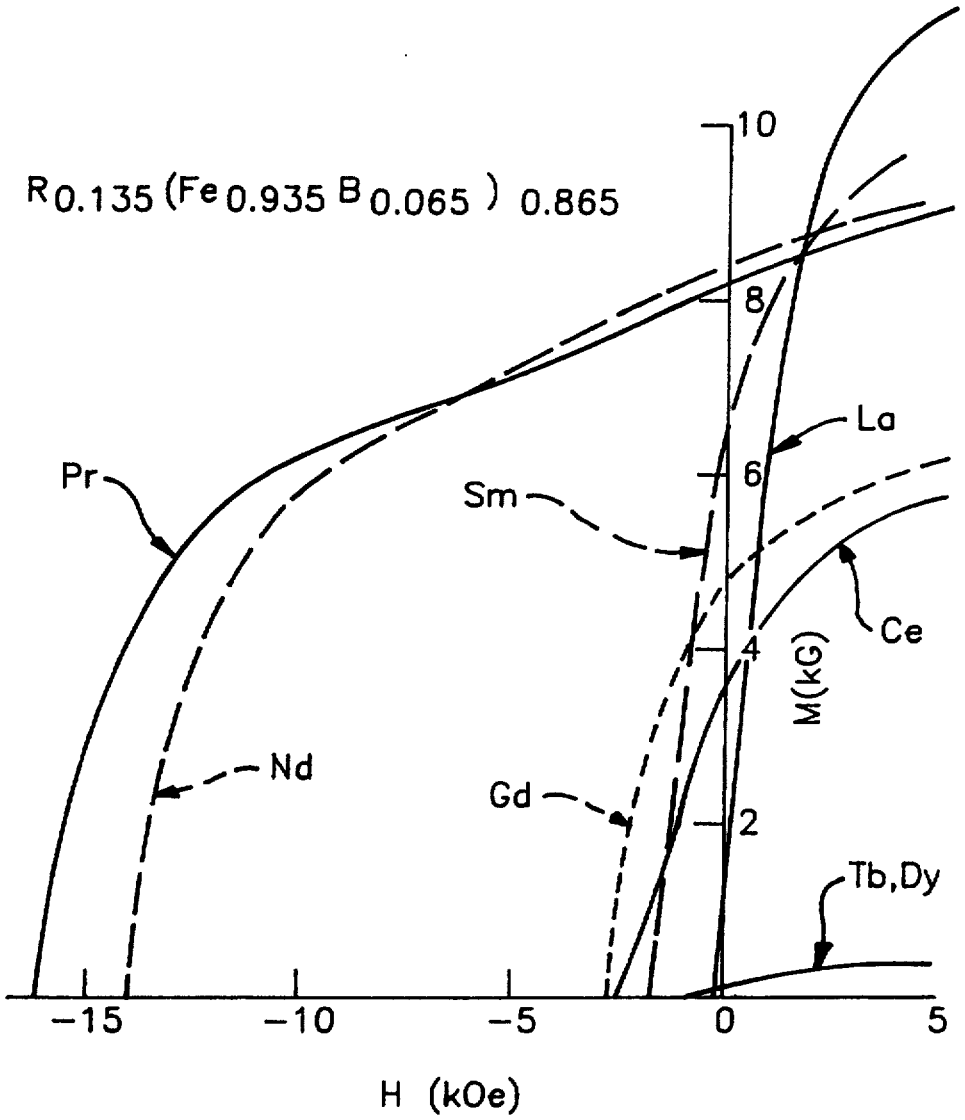
FIG. 1 is a graph reproduced from J. Appl. Phys. Vol 55(1984), page 2079, showing the demagnetizing curve of $R_{0.135}(Fe_{0.935}B_{0.065})_{0.865}$.
Figure 2:
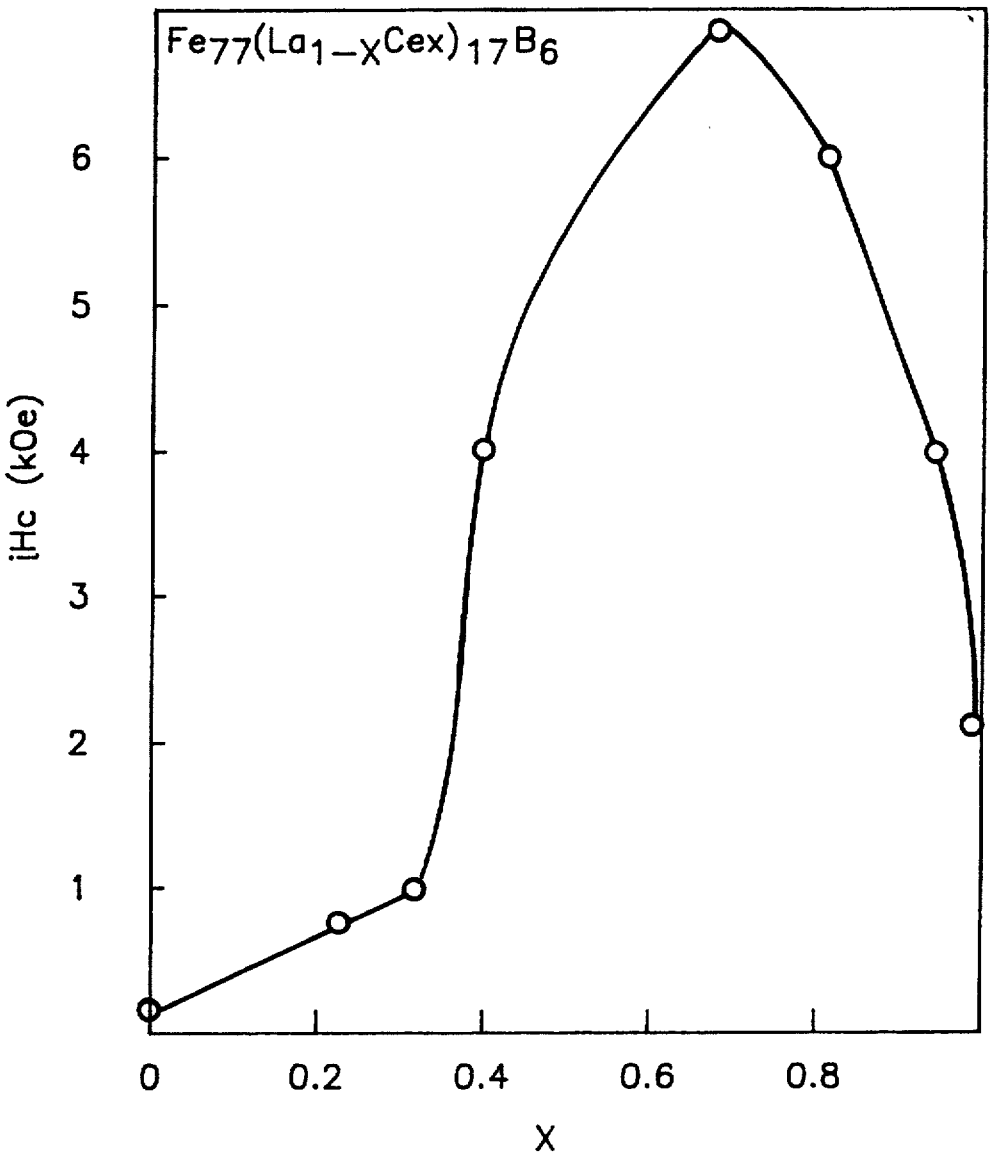
FIG. 2 is a graph indicating the relationship between the x-value of $Fe_{77}(La_{1-x}Ce_x)_{17}B_6$ and the coercive force (iHc); and, FIGS. 3 and 4 are graphs indicating the relationship between the coercive force (iHc) and the circumferential speed (V) of the single cooling roll used for cooling $Fe_{75}M_{15}B_{10}$ and $Fe_{78}M_{17}B_5$, respectively.

Referring to FIG. 2, the coercive force (iHc) of $Fe_{77}(La_{1-x}Ce_x)_{17}B_6$ allow in the form of a sheet 20 μm in thickness and 3 mm in width is shown. This sheet is formed by a method of rapid cooling of the melt. The values of coercive force (iHc) of the $Fe_{77}(La_{1-x}Ce_x)_{17}Be_6$ alloy with x=1 (i.e., $Fe_{77}Ce_{17}B_6$) and x=0 (i.e., $Fe_{77}La_{17}B_6$) corresponds to those of "Ce" and "La" shown in FIG. 1, respectively. There is a slight difference in the values of coercive force (iHc) between FIGS. 1 and 2 due to the composition change. As is shown in FIG. 2, the coercive force (iHc) is drastically enhanced by the copresence of La and Ce, as compared with the case of the presence of La or Ce above. The coercive force (iHc) amounts to approximately 7 KOe at the x value of approximately 0.65. This value of coercive force (iHc) is approximately one half of the rare earth-iron-cobalt permanent magnet, in which the rare earth component is mainly composed of Pr or Nd.

The reasons for limiting the quantity of each elements for $(Ce_xLa_{1-x})_z(Fe_{1-v}B_v)_{1-z}$ alloy (first composition) are now explained.

The content (x) of Ce based on the sum of Ce and La is determined as $x=0.4\sim0.9$, because at $x<0.4$ or $x>0.9$ the coercive force (iHc) attained is only approximately the same value as attained by La alone or Ce alone. The content (z) of Ce and La is determined as $z=0.05\sim0.3$, because at $z<0.05$ the squareness ratio and coercive force (iHc) are low and at $z>0.3$ the remanence is low. The content (v) of B based on sum of Fe and B is from 0.01 to 0.3, because at $v<0.01$ the coercive force is low and at $v>0.3$ the remanence is low. To obtain a high coercive force (iHc), preferably $0.6 \leqq x \leqq 0.8$, $0.02 \leqq v \leqq 0.15$, and $0.1 \leqq z \leqq 0.2$. More preferably, v from 0.03 to 0.12 ($0.03 \leqq v \leqq 0.12$).

The coercive force (iHc) of at least 4 kOe is an index for a prominent synergistic effect of Ce and La as is shown in FIG. 2, and is a magnetic property which allows the permanent magnet according to the present invention to replace the various permanent magnets now on the market. The competitiveness of permanent magnets is determined by the magnetic properties, in view of the cost. In the present invention, a large quantity of Fe and B, which are inexpensive, is used, and La and Ce, which are the most abundant among the rare earth elements, are used, so that the cost of such a permanent magnet is considerably less than the rare earth-cobalt magnet and the Pr/Nd-Fe-B magnet. Accordingly, the permanent magnet according to the present invention is extremely competitive with the rare earth-cobalt magnet, Pr/Nd-Fe-B magnet, and ferrite magnet.

Figure 3:
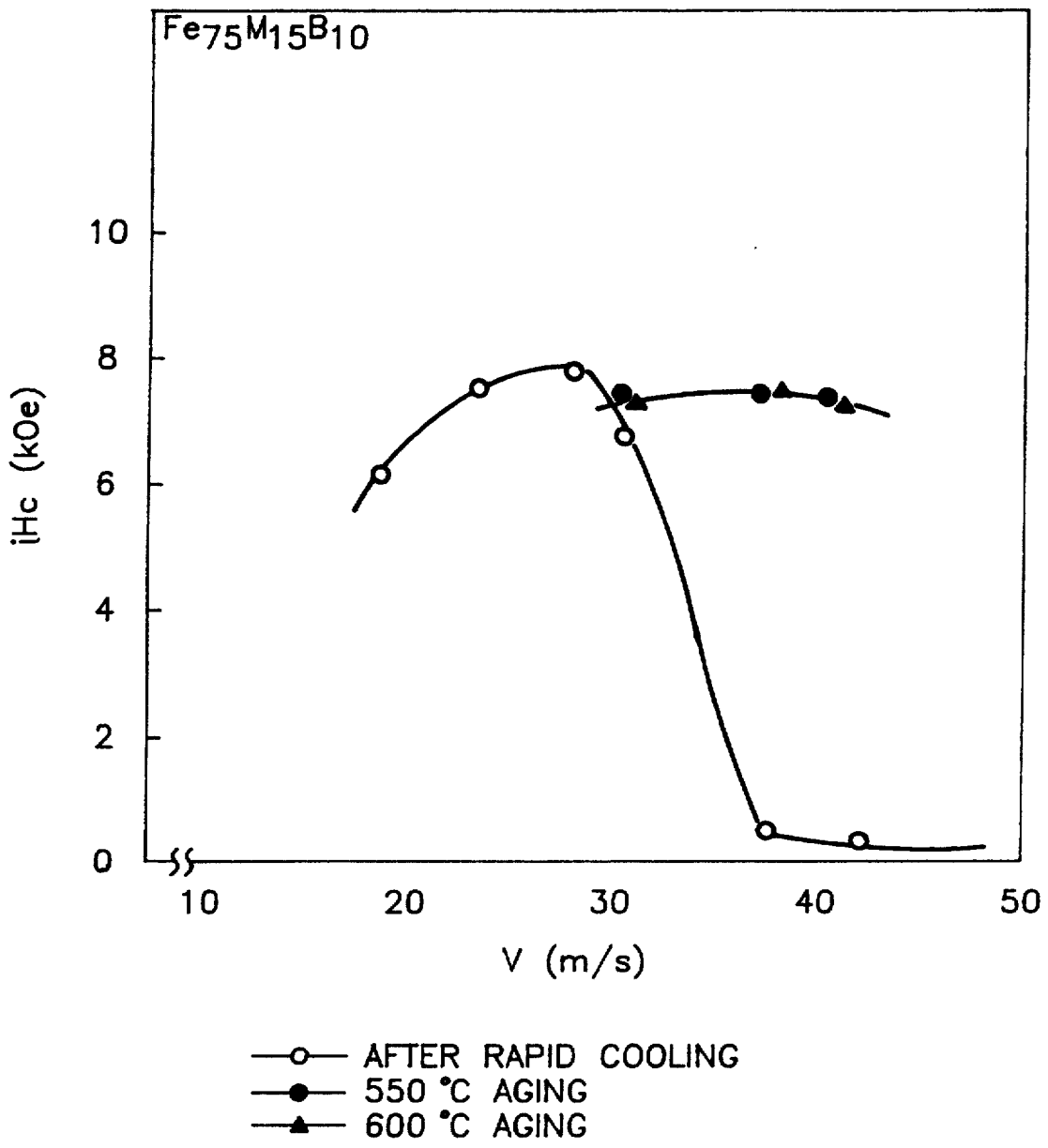
Figure 4:
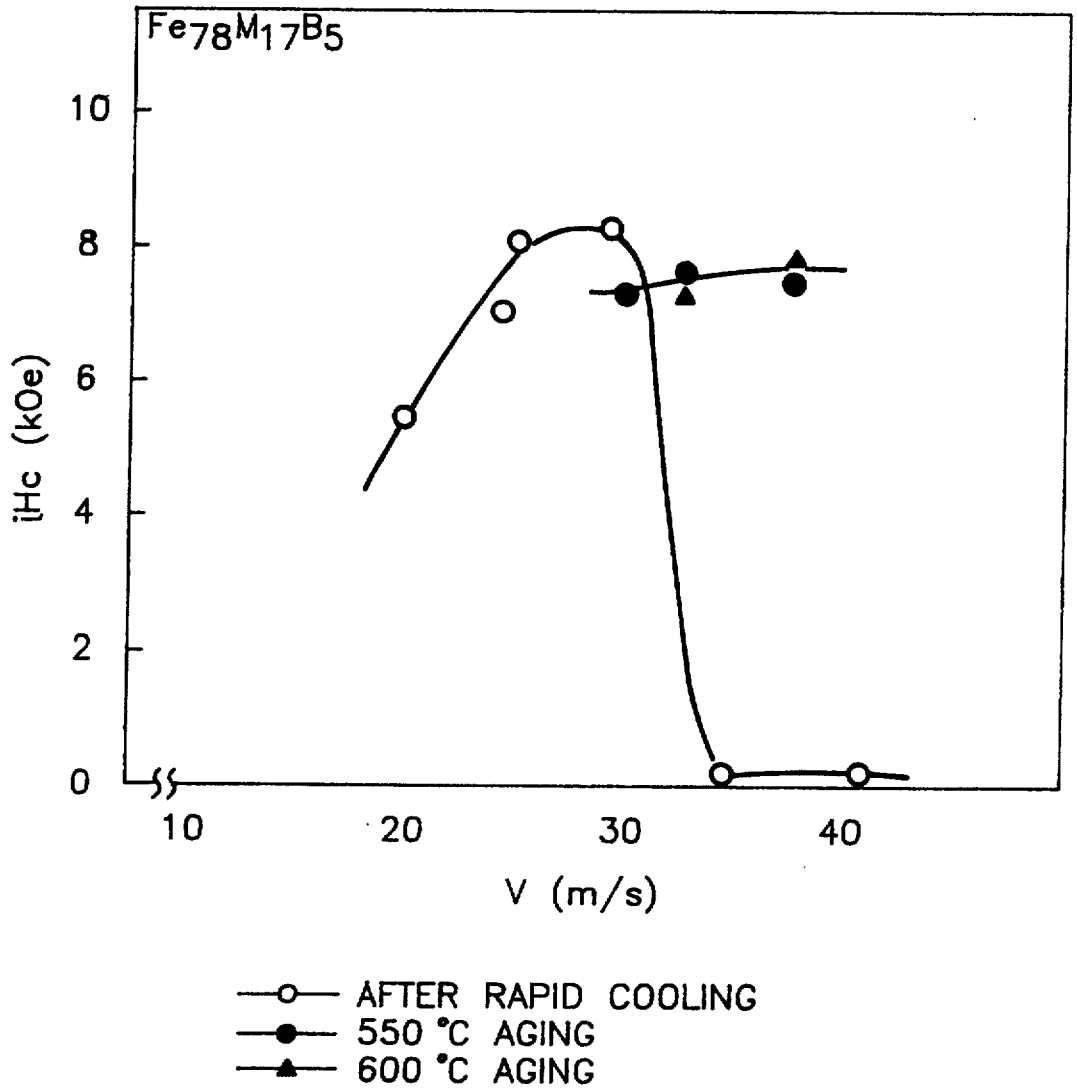

FIGS. 3 and 4 are graphs showing the coercive force (iHc) of the $Fe_{75}M_{15}B_{10}$ and $Fe_{78}M_{17}B_5$ alloys, respectively, in dependency on the circumferential speed V(m/sec) of a single roll for cooling the melt of the two alloys. The symbol M of these two alloys is a mixed metal consisting of approximately 32% of La, approximately 48% of Ce, approximately 15 % of Nd, approximately 4.5% of Pr, approximately 0.3% of Sm, and a balance of Fe and impurities. The curves—O—indicates the coercive force (iHc) after rapid cooling. As is apparent from FIGS. 3 and 4, the coercive force (iHc) amounts to a highest value of approximately 8 kOe at the circumferential speed of the roll (V) of 30 m/sec.

The curves—●—and—▲— indicate the coercive force (iHc) when rapid cooling at a rate as shown in FIGS. 3 and 4 and then aging at 550° C. and 600° C., respectively are carried out. These curves indicate that the coercive force (iHc), though low after cooling, can be enhanced by aging.

The results shown in FIGS. 3 and 4 indicate that the synergistic effect of La and Ce is attained even in the presence of a minor quantity of rare earth elements other than La and Ce.

The permanent magnet having the second composition is based upon the above recognition and contains a rare earth element(s) other than La and Ce. The ranges of x, y, and z and their preferred ranges, as well as the reasons for determining them, are the same as those for the first composition. The content (y) of Ce and La based on the sum of Ce, La, and R is more than 0.2 ($y>0.2$) and less than 1.0 ($y<1.0$), preferably from 0.5 to less than 1.0 ($0.5 \leqq y<1.0$).

In the alloys having the first and second compositions, at least one element selected from the group consisting of Al, Ti, Y, Cr, Mn, Mn, Zr, Hf, Nb, Ta, Mo, Ge, Sb, Sn, Bi, Ni, W, Cu, and Ag may be contained at an atomic ratio of 0.2 or less based on the sum of the at least one element and Fe. These elements such as Al, Ti and the like are effective for enhancing the coercive force (iHc). When the atomic ratio (u) exceeds 0.2, the remanence decreases. A preferred (u) is from 0.001 to 0.1, and more preferred (u) is from 0.002 to 0.05, in the light of high coercive force (iHc) and energy product. In addition, at least one element selected from the group consisting of Si, C, P, N. Ge, and S may partly substitute for B of the first and second compositions, at an atomic ratio of 0.5 or less based on the sum of B and said at least one element. Boron which is partly replaced with Si and the like exerts the same effects as the boron alone.

The first and second compositions may contain Co at an atomic ratio (w) and at least one element selected from the group consisting of Al, Ti, V, Cr, Mn, Zr, Hf, Nb, Ta, Mo, Ge, Sb, Sn, Bi, Ni, W, Cu, and Ag is contained at an atomic ratio (u), wherein said (w) is from more than 0 to 0.5 and said (u) is from 0 to 0.2, with the proviso that sum of (u), (w) and atomic ratio of Fe is 1.0.

Co enhances the Curie point and improves the magnetic properties, especially the temperature characteristic of remanence (Br). When the atomic ratio (w) exceeds 0.5, the magnet becomes expensive and the coercive force (iHc) becomes low. A preferred (w) is from 0.001 to 0.35.

The permanent magnet can be produced by a rapid cooling method.

The permanent magnet also can be produced by rapidly cooling and then aging the product. The aging at a temperature of from 350° C. to 950° C. can increase the coercive force (iHc).

The permanent magnet according to the present invention can also be produced by a sintering method as explained hereinafter.

The raw materials are mixed to obtain a predetermined composition and are then melted within an inert gas atmosphere, such as argon atmosphere, or under vacuum. The melt is then cast into an ingot. Instead of forming an ingot, a ribbon or powder may be formed of means of rapidly cooling the melt which may be obtained by melting the predetermined composition of the raw materials or by remelting the ingot. Subsequently, the obtained ingot, ribbon or powder is solutionized and then aged, if necessary, and is then pulverized. The pulverizing is carried out by a conventional rough crushing and fine crushing. The obtained magnet-alloy powder usually has a size of from 2 to 15 μm. The magnet-alloy powder is compression-formed under the absence of a magnetic field or under magnetic field of from 3 to 15 kOe. The obtained green compact is sintered at a temperature of from 900° C. to 1200° C. for the time period of from 0.5 to 6 hours, under vacuum, or in an inert gas atmosphere. After the sintering, the sintered body is cooled. If necessary, the aging is carried out at a temperature of from 350° C. to 950° C. for the time period of from 0.2 to 60 hours. The multiple stage aging, in which the first aging is at a high temperature with subsequent aging stages carried out at a lower temperature, is preferred in the light of a high coercive force.

The permanent magnet according to the present invention can be produced by bonding the powder with resin or the like, as explained hereinafter.

The raw materials are mixed to obtain a predetermined composition and are then melted in an inert gas atmosphere, such as argon atmosphere, or under vacuum. The melt is then cast into an ingot. The ingot is crushed into fine pieces and these pieces are melted and subjected to the rapid cooling method so as to produce a ribbon or powder. The ribbon or powder is, if necessary, appropriately heat treated under normal pressure or under the application of pressure. The pressure application may be carried out by hot pressing for inducing a uniaxial crystal anisotropy.

The sintered body produced by the above described process may be aged at a temperature of from 950° C. to 350° C. for the time period of from 0.2 to 60 hours. The temperature and time pattern for aging can be varied to obtain the optimum results. Preferably, the sintered body is aged in an inert gas atmosphere or under vacuum.

The ribbon, fine pieces, and sintered body are crushed to obtain the magnet alloy powder. The crushing is carried out by the conventional rough crushing and fine crushing method. The obtained magnet-alloy powder has usually a size of from 5 to 300 μm. The magnet-alloy powder is surface treated, if necessary. The magnet-alloy powder and a binder are mixed together at a predetermined proportion. The binder may be either a resin binder or metal binder. Instead of mixing the binder with the magnet-alloy powder, the binder may be impregnated into the shaped mass of magnet alloy powder. The mixed powder and binder are compression-shaped in the presence of a magnetic field of from 3 to 15 kOe, to shape the mixture.

The binder is satisfactorily hardened after the compression shaping. The magnet alloy-powder is oriented in the presence of the magnetic field which is applied to the mixture prior to or during the compression.

Alternatively, injection molding may be carried out instead of compression shaping.

The compression force, and the solidification time and temperature may be those used for the known bonded magnets.

Plastic working methods according to the present invention are described hereinafter.

(1) Melting Step

Metal, alloy, or a compound as the raw materials are mixed, heated, and melted in a high frequency melting furnace, electric furnace, or the like.

(2) Casting Step

Molten alloy is injected through a quartz nozzle onto a cooling roll in an inert gas atmosphere, such as argon gas, and is rapidly cooled, so as to form a ribbon having a thickness of several tens of microns (μm). Alternatively, the molten alloy may be cast as an ingot or pulverized as powder or pieces. The powder or pieces may be in any form.

(3) Pulverizing Step

The ribbon is pulverized in an inert gas atmosphere, by means of a mill, into powder having a diameter in the range of a few microns (μm) to a few millimeters (μm). The ingot is pulverized similarly. The pulverizing may be such that minute particles having a single magnetic domain are obtained. Alternatively, particles coarser than single domain particles may be obtained. The pulverizing step may be occasionally omitted.

(4) Forming Step

In this step, the powder is formed to obtain the shape of an intermediate or final product, and the magnetic anisotropy is induced by plastic working. The kinds of forming are powder-compacting, hot-pressing, sintering, swaging, extruding, forging, rolling, and the like. The final product can be shaped into a sheet, a ring, a rod, or a block, etc.

Material having a ridigity appropriate for the plastic working, such as the green compact or sintered body, is subjected to deformation by the plastic working, e.g., hot-pressing, swaging, extruding, forcing, rolling, and the like. The once plastically worked material may be again plastically worked.

When plastically working the hot-pressed body, the powder is hot-pressed in an inert gas atmosphere or vacuum, and the hot-pressed powder is heated to a temperature of from 600° C. to 1100° C. in an electric furnace or by induction heating in an inert gas atmosphere or vacuum and then plastically worked under the temperature-elevated condition.

When plastically working the sintered body, the sintering is carried out at a temperature of from 800° C. to 1150° C. and the plastic working then carried out at a temperature-elevated state up to 600° C. to 1100° C.

When carrying out the plastic working by hot pressing, the hot-pressing for obtaining an intermediate or final product is carried out under a pressure ranging from 200 to 1000 kg/cm$^2$ and at a time ranging from 1 to 300 minutes. The magnetic properties are stable regardless of variation in the plastic working condition within the above ranges, and the products having stable magnetic properties are easily industrially produced.

When carrying out the plastic working by extrusion, products having stable magnetic properties are obtained at the extrusion pressure ranging from 400 to 3000 kg/cm$^2$.

The permanent magnet according to the present invention is plastically worked at a rate of from 5 to 80%. This rate refers to the degree of working from the starting material to the final product, expressed as usual in terms of reduction in thickness or cross sectional area. The plastic working can be carried out at any time for forming the starting material into the final product. The single plastic working at 80% can be applied to the starting material for forming the final product. When the deformation force is imparted to a workpiece in a radial direction, such as in the extrusion and swaging, a radially oriented magnet can be obtained by this plastic working, since the alloy particles are radially oriented at a high degree, with the proviso that the working degree is 30% or more.

The permanent magnet having the compositions explained above has improved plastic workability due to the Ce, La, R, Fe, and B, and magnetic anisotropy is induced due to warm hot-working. The permanent magnet may be subjected to any plastic working but is preferably subjected to plastic working that includes hot-pressing of the sintered body. According to this method, the powder having a predetermined composition is sintered to obtain an intermediate form, and then the sintered body is finally, plastically formed. In this method, the degree of plastic working is made to be appropriate because not the starting workpiece but the intermediate shape is plastically formed. In addition, bending and warping of the sintered body are prevented because the sintered body doe not have the final shape but only an intermediate shape. By subjecting the sintered body to the final plastic working, it is possible to obtain a very thin or fine product having a high dimensional accuracy and a good shape. The product obtained by this method can have a sheet thickness of 0.1 mm or more or a diameter of 0.1 mm or more.

When the rare earth elements other than La and Ce are used, that is, in the case of the first and second compositions, the weight ratio of a heavy rare earth element is preferably 0.4 or less, more preferably 0.2 or less, based on the total weight of the rare earth elements.

According to the present invention, the coercive force (iHc) arrives at the highest value at the atomic proportion of La: Ce of approximately 0.35: approximately 0.65. The highest coercive force (iHc) is approximately 35 times as high as the composition containing La alone as the rare earth, and approximately 3.5 times as high as that containing Ce as the rare earth element.

The present inventors investigated, by the X-ray diffraction method, the crystal structure of the $Fe_{78}(La_{1-x}Ce_x)_{17}B_5$ alloy explained with reference to FIG. 2 and confirmed the presence of $R_2Fe_{14}B$ type crystal therein, which has heretofore been identified in the Nd-Fe-B alloy. La has heretofore been deemed not to form the $R_2Fe_{14}B$ crystal and has not been used as the main rare earth (R) component. It was discovered by the present inventors that when La and Ce are copresent the $R_2Fe_{14}B$ crystal is formed. It is therefore believed that the $R_2Fe_{14}B$ crystal contributes to enhancing the coercive force (iHc).

It is known that $Ce_2Fe_{14}B$ forms a tetragonal crystal with the lattice parameter $(a_0)=0.8777$, having the coercive force (iHc) considerably higher than La-Fe-B. The coercive force (iHc) attained by the copresence of Ce and La according to the present invention is considerably higher than that of $Ce_2Fe_{14}B$. Such an enhancement of coercive force (iHc) may be attributed to the particular proportion of La to Ce present in the $R_2Fe_{14}B$ crystal. Such proportion appears to be advantageous from the view points of lattice constant and crystal anisotropy.

Methods for producing the permanent magnet according to the present invention are described hereinafter.

The present invention is hereinafter explained with reference to the examples.

EXAMPLE 1

Ingots having the composition given in Table 1 were produced by a melting method and then pulverized. Using the obtained powder, samples in a ribbon form were produced by a melt-rapid cooling method using a single roll while varying its surfacial speed from 10 to 50 m/sec. The highest coercive force (iHc) obtained by varying the surfacial speed is given in Table 1.

TABLE 1

| No. | Composition | iHc(KOe) | Remarks |
|---|---|---|---|
| 1 | $((Ce_{0.7}La_{0.3})_{0.8}(Nd_{0.7}Pr_{0.3})_{0.2})_{0.17}(Fe_{0.93}B_{0.07})_{0.83}$ | 8.3 | |
| 2 | $((Ce_{0.6}La_{0.4})_{0.8}(Nd_{0.7}Pr_{0.3})_{0.2})_{0.17}(Fe_{0.93}B_{0.07})_{0.83}$ | 7.1 | |
| 3 | $((Ce_{0.8}La_{0.2})_{0.8}(Nd_{0.7}Pr_{0.3})_{0.2})_{0.17}(Fe_{0.93}B_{0.07})_{0.83}$ | 7.2 | |
| 4 | $((Ce_{0.7}La_{0.3})_{0.7}(Nd_{0.7}Pr_{0.3})_{0.3})_{0.17}(Fe_{0.93}B_{0.07})_{0.83}$ | 8.3 | |
| 5 | $((Ce_{0.7}La_{0.3})_{0.9}(Nd_{0.7}Pr_{0.3})_{0.1})_{0.17}(Fe_{0.93}B_{0.07})_{0.83}$ | 7.8 | |
| 6 | $(Ce_{0.8}(Nd_{0.7}Pr_{0.3})_{0.2})_{0.17}(Fe_{0.93}B_{0.07})_{0.83}$ | 2.5 | Comparative |
| 7 | $(La_{0.8}(Nd_{0.7}Pr_{0.3})_{0.2})_{0.17}(Fe_{0.93}B_{0.07})_{0.83}$ | 0.7 | " |
| 8 | $(Ce_{0.7}(Nd_{0.7}Pr_{0.3})_{0.3})_{0.17}(Fe_{0.93}B_{0.07})_{0.83}$ | 3.0 | " |
| 9 | $(La_{0.7}(Nd_{0.7}Pr_{0.3})_{0.3})_{0.17}(Fe_{0.93}B_{0.07})_{0.83}$ | 1.2 | " |
| 10 | $(Ce_{0.9}(Nd_{0.7}Pr_{0.3})_{0.1})_{0.17}(Fe_{0.93}B_{0.07})_{0.83}$ | 2.7 | " |
| 11 | $(La_{0.9}(Nd_{0.7}Pr_{0.3})_{0.1})_{0.17}(Fe_{0.93}B_{0.07})_{0.83}$ | 0.6 | " |

EXAMPLE 2

The raw materials were mixed so that the alloy according to the present invention, having the composition $[(Ce_{0.7}La_{0.3})_{0.6}(Nd_{0.7}Dy_{0.3})_{0.4}]_{0.15}(Fe_{0.91}(B_{0.09})_{0.85}$, and the conventional alloy having the composition $Nd_{0.15}(Fe_{0.91}B_{0.09})_{0.85}$, were obtained. The raw materials were melted in a high-frequency furnace and cast as ingots. The ingots were pulverized by successively using a jaw-crusher, a Brown mill, and a jet mill, to obtain powder successively finer in size. Fine powders 5 μm in diameter were finally obtained. The fine powder was pressed under a magnetic field and then pre-sintered at 950° C. to obtain a pre-sintered body having the dimension of 20×20×20 mm. The pre-sintered body was hot-pressed in a direction parallel to the easy direction of magnetization, using dies having a dimension of 24×24 mm. The conditions for hot-pressing were: a temperature of 830° C.; a time of 1 hour, and a pressure of 650 kg/cm$^2$. The plastic workability and magnetic properties are shown in Table 2.

TABLE 2

| | Coercive Force (iHc) (kOe) | Remanence (Br) (KG) | Maximum Energy Product (MGOe) | Plastic Workability |
|---|---|---|---|---|
| Invention | 7.0 | 10.5 | 23 | ◎ |
| Invention | 7.0 | 10.0 | 21 | — |
| Conventional | 12.1 | 12.3 | 35 | X |
| Conventional | 12.1 | 12.0 | 35 | — |

The plastic workability was evaluated by the following four standards: good ( )-working degree of 30% or more; acceptable ( )-working degree less than but close to 30%; poor (Δ)-working degree less than 20%; and, unacceptable (×)-virtually no deformation.

The sintered bodies (without hot-pressing) had a density of 94% relative to theoretical density.

As is apparent from Table 2, the plastic workability is drastically enhanced by the replacement of Nd with La and Ce.

EXAMPLE 3

The ingots having the composition as shown in Table 3 were produced by the melting method. The ingots were crushed into fine pieces. The fine pieces were melted and then rapidly cooled by the rapid cooling method used in Example 1.

The coercive force (iHc) of the ribbon is given in Table 3.

TABLE 3

| Sample Nos. | Composition | iHc(kOe) | |
|---|---|---|---|
| 1 | $((Ce_{0.7}La_{0.3})_{0.7}(Nd_{0.7}Pr_{0.3})_{0.3})_{0.17}((Fe_{0.99}Al_{0.01})_{0.92}B_{0.08})_{0.83}$ | 10.2 | |
| 2 | $((Ce_{0.7}La_{0.3})_{0.7}(Nd_{0.7}Pr_{0.3})_{0.3})_{0.17}((Fe_{0.97}Al_{0.03})_{0.92}B_{0.08})_{0.83}$ | 12.5 | |
| 3 | $((Ce_{0.7}La_{0.3})_{0.7}(Nd_{0.7}Pr_{0.3})_{0.3})_{0.17}((Fe_{0.99}Nb_{0.01})_{0.92}B_{0.08})_{0.83}$ | 10.1 | |
| 4 | $((Ce_{0.7}La_{0.3})_{0.7}(Nd_{0.7}Pr_{0.3})_{0.3})_{0.17}((Fe_{0.97}Nb_{0.03})_{0.92}B_{0.08})_{0.83}$ | 11.5 | |
| 5 | $((Ce_{0.7}La_{0.3})_{0.7}(Nd_{0.65}Pr_{0.15}Dy_{0.2})_{0.3})_{0.17}((Fe_{0.985}Zr_{0.015})_{0.92}B_{0.08})_{0.83}$ | 10.1 | |
| 6 | $((Ce_{0.7}La_{0.3})_{0.7}(Nd_{0.7}Pr_{0.3})_{0.3})_{0.17}((Fe_{0.985}Mo_{0.015})_{0.92}B_{0.08})_{0.83}$ | 10.3 | |
| 7 | $((Ce_{0.7}La_{0.3})_{0.7}(Nd_{0.7}Pr_{0.3})_{0.3})_{0.17}((Fe_{0.985}Hf_{0.015})_{0.92}B_{0.08})_{0.83}$ | 9.7 | |
| 8 | $((Ce_{0.7}La_{0.3})_{0.7}(Nd_{0.7}Pr_{0.3})_{0.3})_{0.17}((Fe_{0.985}Ag_{0.015})_{0.92}B_{0.08})_{0.83}$ | 9.7 | |
| 9 | $((Ce_{0.7}La_{0.3})_{0.7}(Nd_{0.7}Pr_{0.3})_{0.3})_{0.17}((Fe_{0.985}Ti_{0.015})_{0.92}B_{0.08})_{0.83}$ | 9.6 | |
| 10 | $((Ce_{0.7}La_{0.3})_{0.7}(Nd_{0.7}Pr_{0.3})_{0.3})_{0.17}((Fe_{0.985}V_{0.015})_{0.92}B_{0.08})_{0.83}$ | 9.5 | |
| 11 | $((Ce_{0.7}La_{0.3})_{0.7}(Nd_{0.7}Pr_{0.3})_{0.3})_{0.17}((Fe_{0.985}Ni_{0.015})_{0.92}B_{0.08})_{0.83}$ | 9.4 | |
| 12 | $((Ce_{0.7}La_{0.3})_{0.7}(Nd_{0.7}Pr_{0.3})_{0.3})_{0.17}((Fe_{0.835}Co_{0.15}Al_{0.015})_{0.92}B_{0.08})_{0.83}$ | 10.1 | |
| 13 | $((Ce_{0.7}La_{0.3})_{0.7}(Nd_{0.7}Pr_{0.3})_{0.3})_{0.17}((Fe_{0.835}Co_{0.15}Nb_{0.015})_{0.92}B_{0.08})_{0.83}$ | 10.0 | |
| 14 | $((Ce_{0.7}La_{0.3})_{0.7}(Nd_{0.7}Pr_{0.3})_{0.3})_{0.17}(Fe_{0.92}B_{0.08})_{0.83}$ | 8.3 | |
| 15 | $((Ce_{0.7}La_{0.3})_{0.17}(Fe_{0.92}B_{0.08})_{0.83}$ | 7.0 | |
| 16 | $((Ce_{0.7}(Nd_{0.7}Pr_{0.3})_{0.3})_{0.17}(Fe_{0.92}B_{0.08})_{0.83}$ | 3.0 | Comparative |
| 17 | $((La_{0.7}(Nd_{0.7}Pr_{0.3})_{0.3})_{0.17}(Fe_{0.92}B_{0.08})_{0.83}$ | 1.2 | Comparative |

EXAMPLE 4

The ingots having the composition as shown in Table 4 were produced by the melting method. The ingots were crushed into fine pieces. The fine pieces were melted and then rapidly cooled by the rapid cooling method used in Example 1.

The obtained powder was surface-treated and was mixed with a binder at a weight proportion of from 1:0.02~0.4. The mixture was compression-formed in the presence of a magnetic field of 10 kOe, and then the binder was solidified.

The magnetic properties of the bonded magnet are shown in Table 4.

TABLE 4

| Sample Nos. | Composition | Properties Br (KG) | Hc (kOe) | (BH)max (MGOe) | Remarks |
|---|---|---|---|---|---|
| 1 | $(Ce_{0.7}La_{0.3})_{0.17}(Fe_{0.92}B_{0.08})_{0.83}$ | 4.4 | 6.5 | 4.2 | |
| 2 | $((Ce_{0.7}La_{0.3})_{0.7}(Nd_{0.7}Pr_{0.3})_{0.3})_{0.17}(Fe_{0.92}B_{0.08})_{0.83}$ | 4.9 | 8.5 | 5.5 | |
| 3 | $((Ce_{0.7}La_{0.3})_{0.7}(Nd_{0.7}Pr_{0.3})_{0.3})_{0.17}((Fe_{0.985}Al_{0.015})_{0.92}B_{0.08})_{0.83}$ | 4.7 | 11.0 | 5.1 | |
| 4 | $((Ce_{0.7}La_{0.3})_{0.7}(Nd_{0.7}Pr_{0.3})_{0.3})_{0.17}((Fe_{0.985}Nb_{0.015})_{0.92}B_{0.08})_{0.83}$ | 4.9 | 10.5 | 5.2 | |
| 5 | $(Ce_{0.7}(Nd_{0.7}Pr_{0.3})_{0.3})_{0.17}(Fe_{0.92}B_{0.08})_{0.83}$ | 3.5 | 3.0 | 1.8 | Comparative |
| 6 | $(La_{0.7}(Nd_{0.7}Pr_{0.3})_{0.3})_{0.17}(Fe_{0.92}B_{0.08})_{0.83}$ | 2.0 | 1.2 | 0.7 | Comparative |

EXAMPLE 5

The raw materials were mixed to provide the composition as given in Table 5 and then melted by a high frequency furnace in an argon atmosphere. The melt was cast and the obtained ingots were finely crushed to obtain powder having particles from 3 to 10 μm in size. The powder was compression formed in the presence of a magnetic field of approximately 10 kOe, to obtain oriented green compacts. The green compacts were sintered at a temperature of from 950° to 1150° C. for approximately 2 hours under vacuum, followed by cooling. The sintered bodies were aged, while lowering the temperature from 950° C. down to 350° C. The sintered bodies were then crushed to obtain powder having particles from 10 to 200 μm in size. The powder was subjected to stress relief annealing. The powder was mixed with a binder at a weight proportion of from 1:0.02~0.4. The mixture was compression-formed in the presence of a magnetic field of 10 kOe, and the binder was then solidified.

The magnetic properties of the bonded magnet are shown in Table 5.

EXAMPLE 6

The ribbons having the composition given in Table 6 were produced by the process essentially the same as used in Example 1. The temperature coefficient of remanence (Br) was measured.

The results are given in Table 6. As is understood from Table 6, Co improves the temperature characteristic of remanence (Br).

TABLE 6

| Sample Nos. | Composition | Temperature Coefficient of Br (%/°C.) |
|---|---|---|
| 1 | $((Ce_{0.7}La_{0.3})_{0.7}(Nd_{0.7}Pr_{0.3})_{0.3})_{0.17}((Fe_{0.985}Al_{0.015})_{0.92}B_{0.08})_{0.83}$ | −0.15 |
| 2 | $((Ce_{0.7}La_{0.3})_{0.7}(Nd_{0.7}Pr_{0.3})_{0.3})_{0.17}((Fe_{0.985}Nb_{0.015})_{0.92}B_{0.08})_{0.83}$ | −0.15 |
| 3 | $((Ce_{0.7}La_{0.3})_{0.7}(Nd_{0.7}Pr_{0.3})_{0.3})_{0.17}((Fe_{0.835}Co_{0.15}Al_{0.015})_{0.92}B_{0.08})_{0.83}$ | −0.10 |
| 4 | $((Ce_{0.7}La_{0.3})_{0.7}(Nd_{0.7}Pr_{0.3})_{0.3})_{0.17}((Fe_{0.835}Co_{0.15}Al_{0.015})_{0.92}B_{0.08})_{0.83}$ | −0.10 |

EXAMPLE 7

The ingots having the composition as given in Table 7 were produced, followed by rough and then fine crushing to obtain fine powder having particles from approximately 3 to 6 μm in size. The powder was then compression molded in the presence of a magnetic field of approximately 10 kOe and at a pressure of 1.5 ton/cm$^2$. The obtained green compacts were sintered at a temperature of from 1000° C. to 1100° C. for 2 hours. The sintered bodies were aged at 500° C.-900° C. The magnetic properties of the produced magnets are given in Table 7.

TABLE 5

| Sample Nos. | Composition | Properties of Magnet iHc (kOe) | Br (KG) | (BH)max (MGOe) | Remarks |
|---|---|---|---|---|---|
| 1 | $((Ce_{0.7}La_{0.3})_{0.7}(Nd_{0.55}Pr_{0.1}Dy_{0.35})_{0.3})_{0.17}(Fe_{0.92}B_{0.08})_{0.83}$ | 6.8 | 5.4 | 5.8 | |
| 2 | $((Ce_{0.7}La_{0.3})_{0.7}(Nd_{0.65}Pr_{0.15}Dy_{0.2})_{0.3})_{0.17}((Fe_{0.985}Al_{0.015})_{0.92}B_{0.08})_{0.83}$ | 5.5 | 5.9 | 6.9 | |
| 3 | $((Ce_{0.7}La_{0.3})_{0.7}(Nd_{0.65}Pr_{0.15}Dy_{0.2})_{0.3})_{0.17}((Fe_{0.985}Nb_{0.015})_{0.92}B_{0.08})_{0.83}$ | 4.6 | 5.6 | 6.2 | |
| 4 | $((Ce_{0.7}La_{0.3})_{0.5}(Nd_{0.65}Pr_{0.15}Dy_{0.2})_{0.5})_{0.17}((Fe_{0.97}Al_{0.015}Nb_{0.015})_{0.92}B_{0.08})_{0.83}$ | 8.5 | 6.5 | 7.8 | |
| 5 | $((Ce_{0.7}La_{0.3})_{0.5}(Nd_{0.65}Pr_{0.15}Dy_{0.2})_{0.5})_{0.17}(Fe_{0.835}Co_{0.015}Al_{0.015})_{0.92}B_{0.08})_{0.83}$ | 7.3 | 6.3 | 7.9 | |
| 6 | $(Ce_{0.7}(Nd_{0.65}Pr_{0.2}Dy_{0.15})_{0.3})_{0.17}(Fe_{0.92}B_{0.08})_{0.83}$ | 2.0 | 3.0 | 1.5 | Comparative |
| 7 | $(La_{0.7}(Nd_{0.65}Pr_{0.2}Dy_{0.15})_{0.3})_{0.17}(Fe_{0.92}B_{0.08})_{0.83}$ | 0.4 | 1.5 | 0.2 | Comparative |

TABLE 7

| Sample Nos. | Composition | iHc (kOe) | Br (KG) | (BH)max (MGOe) | Remarks |
|---|---|---|---|---|---|
| 1 | $((Ce_{0.7}La_{0.3})_{0.7}(Nd_{0.65}Pr_{0.2}Dy_{0.15})_{0.3})_{0.17}(Fe_{0.92}B_{0.08})_{0.83}$ | 4.5 | 8.8 | 16.0 | |
| 2 | $((Ce_{0.7}La_{0.3})_{0.7}(Nd_{0.5}Pr_{0.1}Dy_{0.4})_{0.3})_{0.17}(Fe_{0.92}Al_{0.08})_{0.83}$ | 9.0 | 7.7 | 14.9 | |
| 3 | $((Ce_{0.7}La_{0.3})_{0.7}(Nd_{0.65}Pr_{0.15}Dy_{0.2})_{0.3})_{0.17}((Fe_{0.99}Al_{0.01})_{0.92}B_{0.08})_{0.83}$ | 6.0 | 8.5 | 17.0 | |
| 4 | $((Ce_{0.7}La_{0.3})_{0.7}(Nd_{0.65}Pr_{0.15}Dy_{0.2})_{0.3})_{0.17}((Fe_{0.97}Al_{0.03})_{0.92}B_{0.08})_{0.83}$ | 7.1 | 7.8 | 15.0 | |
| 5 | $((Ce_{0.7}La_{0.3})_{0.7}(Nd_{0.65}Pr_{0.15}Dy_{0.2})_{0.3})_{0.17}((Fe_{0.99}Nb_{0.01})_{0.92}B_{0.08})_{0.83}$ | 5.0 | 8.7 | 15.1 | |
| 6 | $((Ce_{0.7}La_{0.3})_{0.7}(Nd_{0.65}Pr_{0.15}Dy_{0.2})_{0.3})_{0.17}((Fe_{0.97}Nb_{0.03})_{0.92}B_{0.08})_{0.83}$ | 6.0 | 7.8 | 15.3 | |
| 7 | $((Ce_{0.7}La_{0.3})_{0.5}(Nd_{0.65}Pr_{0.15}Dy_{0.2})_{0.5})_{0.17}((Fe_{0.99}Al_{0.01})_{0.92}B_{0.08})_{0.83}$ | 9.0 | 9.8 | 21.7 | |
| 8 | $((Ce_{0.7}La_{0.3})_{0.5}(Nd_{0.65}Pr_{0.15}Dy_{0.2})_{0.5})_{0.17}((Fe_{0.97}Al_{0.03})_{0.92}B_{0.08})_{0.83}$ | 11.0 | 8.6 | 16.2 | |
| 9 | $((Ce_{0.7}La_{0.3})_{0.5}(Nd_{0.65}Pr_{0.15}Dy_{0.2})_{0.5})_{0.17}((Fe_{0.99}Nb_{0.01})_{0.92}B_{0.08})_{0.83}$ | 8.1 | 9.7 | 21.5 | |

TABLE 7-continued

| Sample Nos. | Composition | iHc (kOe) | Br (KG) | (BH)max (MGOe) | Remarks |
|---|---|---|---|---|---|
| 10 | $((Ce_{0.7}La_{0.3})_{0.5}(Nd_{0.65}Pr_{0.15}Dy_{0.2})_{0.5})_{0.17}((Fe_{0.97}Nb_{0.03})_{0.92}B_{0.08})_{0.83}$ | 10.2 | 8.7 | 16.0 | |
| 11 | $((Ce_{0.7}La_{0.3})_{0.7}(Nd_{0.65}Pr_{0.15}Dy_{0.2})_{0.3})_{0.17}((Fe_{0.97}Al_{0.015}Nb_{0.015})_{0.92}B_{0.08})_{0.83}$ | 6.5 | 8.5 | 17.0 | |
| 12 | $((Ce_{0.7}La_{0.3})_{0.5}(Nd_{0.65}Pr_{0.15}Dy_{0.2})_{0.5})_{0.17}((Fe_{0.97}Al_{0.015}Nb_{0.015})_{0.92}B_{0.08})_{0.83}$ | 11.7 | 9.7 | 22 | |
| 13 | $((Ce_{0.7}La_{0.3})_{0.7}(Nd_{0.65}Pr_{0.2}Tb_{0.15})_{0.3})_{0.17}((Fe_{0.985}Al_{0.015})_{0.92}B_{0.08})_{0.83}$ | 5.0 | 8.5 | 15.0 | |
| 14 | $((Ce_{0.7}La_{0.3})_{0.7}(Nd_{0.65}Pr_{0.15}Dy_{0.20})_{0.3})_{0.17}((Fe_{0.835}Co_{0.15}Al_{0.015})_{0.92}B_{0.08})_{0.83}$ | 6.5 | 8.1 | 15.5 | |
| 15 | $((Ce_{0.7}La_{0.3})_{0.5}(Nd_{0.65}Pr_{0.15}Dy_{0.20})_{0.5})_{0.17}((Fe_{0.835}Co_{0.15}Al_{0.015})_{0.92}B_{0.08})_{0.83}$ | 9.9 | 9.1 | 19.8 | |
| 16 | $((Ce_{0.7}(Nd_{0.7}Pr_{0.3})_{0.3})_{0.17}(Fe_{0.92}B_{0.08})_{0.83}$ | 2.1 | 4 | 1 | Comparative |
| 17 | $((La_{0.7}(Nd_{0.7}Pr_{0.3})_{0.3})_{0.17}(Fe_{0.92}B_{0.08})_{0.83}$ | 0.5 | 2 | 0.2 | Comparative |
| 18 | $((Ce_{0.7}(Nd_{0.65}Pr_{0.2}Dy_{0.15})_{0.3})_{0.17}(Fe_{0.92}B_{0.08})_{0.83}$ | 2.8 | 4.5 | 2 | Comparative |
| 19 | $((La_{0.7}(Nd_{0.65}Pr_{0.2}Dy_{0.15})_{0.3})_{0.17}(Fe_{0.92}B_{0.08})_{0.83}$ | 0.7 | 2.1 | 0.2 | Comparative |

EXAMPLE 8

The ribbons having the composition given in Table 8 were produced by the process which was essentially the same as used in Example 7. The temperature coefficient of remanence (Br) was measured.

The results are given in Table 8. As is understood from Table 8, Co improves the temperature characteristic of remanence (Br).

TABLE 8

| No. | Composition | Temperature Coefficient of Br (%/°C.) |
|---|---|---|
| 1 | $((Ce_{0.7}La_{0.3})_{0.7}(Nd_{0.65}Pr_{0.15}Dy_{0.2})_{0.3})_{0.17}((Fe_{0.985}Al_{0.015})_{0.92}B_{0.08})_{0.83}$ | −0.14 |
| 2 | $((Ce_{0.7}La_{0.3})_{0.5}(Nd_{0.65}Pr_{0.15}Dy_{0.2})_{0.5})_{0.17}((Fe_{0.985}Al_{0.015})_{0.92}B_{0.08})_{0.83}$ | −0.14 |
| 3 | $((Ce_{0.7}La_{0.3})_{0.7}(Nd_{0.65}Pr_{0.15}Dy_{0.2})_{0.3})_{0.17}((Fe_{0.835}Co_{0.15}Al_{0.015})_{0.92}B_{0.08})_{0.83}$ | −0.10 |
| 4 | $((Ce_{0.7}La_{0.3})_{0.5}(Nd_{0.65}Pr_{0.15}Dy_{0.2})_{0.5})_{0.17}((Fe_{0.835}Co_{0.15}Al_{0.015})_{0.92}B_{0.08})_{0.83}$ | −0.10 |

We claim:

1. A permanent [magnet] *magnetic powder or ribbon obtained by the rapid cooling method and* having a composition expressed by $(Ce_xLa_{1-x})_z(Fe_{1-v}B_v)_{1-z}$, with a proviso of $0.4 \leqq x \leqq 0.9$, $0.05 \leqq z \leqq 0.3$, and $0.01 \leqq v \leqq 0.3$ and having a coercive force (iHc) of at least 4 kOe.

[2. A permanent magnet according to claim 1, wherein said permanent magnet is a sintered magnet.]

[3. A permanent magnet according to claim 1, wherein said permanent magnet is a bonded magnet.]

4. A permanent [magnet] *magnetic powder or ribbon* according to claim 1, wherein x is from 0.6 to 0.8, v is from 0.02 to 0.15, and z is from 0.1 to 0.2.

5. A permanent [magnet] *magnetic powder or ribbon* according to claim [2] *1*, wherein v is from 0.03 to 0.12.

6. A permanent [magnet] *magnetic powder or ribbon* according to claim [2] *1*, wherein x is approximately 0.65.

7. A permanent magnet [according to claim 1, 2, 3, 4, 5, or 6, wherein] *formed from a rapidly cooled magnetic material having a composition expressed by* $(Ce_xLa_{1-x})_z(Fe_{1-v}B_v)_{1-z}$ *with a proviso of* $0.4 \leqq x \leqq 0.9$, $0.05 \leqq z \leqq 0.3$, *and* $0.01 \leqq v \leqq 0.3$ *and containing* at least one element selected from the group consisting of Al, Ti, V, Cr, Mn, Zr, Hf, Nb, Ta, Mo, Ge, Sb, Sn, Bi, Ni, W, Cu, and Ag [is contained] at an atomic ratio *u* of $0 < u \leqq 0.2$ [or less] based on the sum of said at least one element and Fe *and having a coercive force (iHC) of at least 4 KOe.*

8. A permanent magnet according to claim [1, 2, 3, 4, 5, or 6] *7 or 9*, wherein B is partly replaced with at least one element selected from the group consisting of Si, C, P, N, Ge, and S in an atomic ratio of 0.5 or less based on a sum of B and said at least one element.

9. A permanent magnet according to claim [1] *7*, wherein Co is contained at an atomic ratio (w) and at least one element selected from the group consisting of Al, Ti, V, Cr, Mn, Zr, Hf, Nb, Ta, Mo, Ge, Sb, Sn, Bi, Ni, W, Cu and Ag is contained at an atomic ratio (u), wherein said (w) is from more than 0 to 0.5 and said (u) is from [0] *0.001* to 0.2, with the proviso that sum of (u), (w) and atomic ratio of Fe is 1.0.

10. A permanent magnet according to claim *7 or* 9, wherein said permanent magnet is a sintered magnet.

11. A permanent magnet according to claim *7 or* 9, wherein said permanent magnet is a bonded magnet.

12. A permanent magnet according to claim *7 or* 9, wherein x is from 0.6 to 0.8, v is from 0.02 to 0.15, and z is from 0.1 to 0.2.

13. A permanent magnet according to claim [10] *7 or 9*, wherein v is from 0.03 to 0.12.

14. A permanent magnet according to claim [10] *7 or 9*, wherein x is approximately 0.65.

[15. A permanent magnet having a composition of $[(Ce_xLa_{1-x})_yR_{1-y}]_z(Fe_{1-v}B_v)_{1-z}$, wherein R is at least one rare earth element except for Ce and La, but including Y with a proviso of $0.4 \leqq x \leqq 0.9$, $0.2 < y < 1.0$, $0.05 \leqq z \leqq 0.3$, $0.001 \leqq v \leqq 0.3$, and having a coercive force (iHc) of at least 4 kOe.]

[16. A permanent magnet according to claim 15, wherein said permanent magnet is a sintered magnet.]

[17. A permanent magnet according to claim 15, wherein said permanent magnet is a bonded magnet.]

18. A permanent [magnet] *magnetic powder or ribbon* according to claim [15] *34*, wherein x is from 0.6 to 0.8, v is from 0.02 to 0.15, and z is from 0.1 to 0.2.

19. A permanent [magnet] *magnetic powder or ribbon* according to claim [18] *34*, wherein v is from 0.03 to 0.12.

20. A permanent [magnet] *magnetic powder or ribbon* according to claim [19] *34*, wherein x is approximately 0.65.

[21. A permanent magnet according to claim 15, 16, 17, 18, 19, or 20, wherein at least one element selected from the group consisting of Al, Ti, V, Cr, Mn, Zr, Hf, Nb, Ta, Mo, Ge, Sb, Sn, Bi, Ni, W, Cu, and Ag is contained at an atomic ratio of 0.2 or less based on the sum of said at least one element and Fe.]

22. A permanent magnet according to claim [15, 16, 17, 18, 19 or 20] *23 or 31*, wherein B is partly replaced with at least one element selected from the group consisting of Si, C, P, N, Ge, and S in an atomic ratio of 0.5 or less based on a sum of B and said at least one element.

23. A permanent magnet according to claim [15] *31*, wherein Co is contained at an atomic ratio (w) and at least one element selected from the group consisting Al, Ti, V, Cr, Mn, Zr, Hf, Nb, Ta, Mo, Ge, Sb, Sn, Bi, Ni, W, Cu, and Ag is contained at an atomic ratio (u), wherein said (w) is from more than 0 to 0.5 and said (u) is from [0] *0.001* to 0.2, with the proviso that sum of (u), (w) and atomic ratio of Fe is 1.0.

24. A permanent magnet according to claim 23 *or 31*, wherein said permanent magnet is a sintered magnet.

25. A permanent magnet according to claim 23 *or 31*, wherein said permanent magnet is a bonded magnet.

26. A permanent magnet according to claim 23 *or 31*, wherein x is from 0.6 to 0.8, v is from 0.02 to 0.15, and z is from 0.1 to 0.2.

27. A permanent magnet according to claim [26] *23 or 31*, wherein v is from 0.03 to 0.12.

28. A permanent magnet according to claim [26] *23 or 31*, wherein x is approximately 0.65.

[29. A permanent magnet having a composition of $[(Ce_xLa_{1-x})_yR_{1-y}]_z[(Fe_{1-u-w}Co_wM_u)_{1-v}B_v]_{1-z}$ with a proviso of $0.4 \leqq x \leqq 0.9$, $0.2 < y \leqq 1.0$, $0.05 \leqq z \leqq 0.3$, $0.01 \leqq v \leqq 0.3$, $0 \leqq u \leqq 0.2$, $0 \leqq w \leqq 0.5$, and M is at least one element selected from the group consisting of Al, Ti, V, Cr, Mn, Zr, Hf, Nb, Ta, Mo, Ge, Sb, Sn, Bi, Ni, W, Cu, and Ag, having a coercive force (iHc) of at least 4 kOe, having been plastically worked.

30. A permanent magnet according to claim [29] *33*, wherein the plastic working method is a method selected from the group consisting of hot-pressing, swaging, extruding, forging, and rolling.

*31. A permanent magnet formed from a rapidly cooled magnetic material having a composition of* $[((Ce_xLa_{1-x})_yR_{1-y})_z]((Ce_xLa_{1-x})_yR_{1-y})_z(Fe_{1-v}B_v)_{1-z}$ *wherein R is at least one rare earth element except for Ce and La, but including Y with a proviso of* $0.4 \leqq x \leqq 0.9$, $0.2 < y < 1.0$, $0.05 \leqq z \leqq 0.3$, $0.01 \leqq v \leqq 0.3$ *containing at least one element selected from the group consisting of Al, Ti, V, Cr, Mn, Zr, Hf, Nb, Ta, Mo, Ge, Sb, Sn, Bi, Ni, W, Cu, and Ag at an atomic ratio u of* $0 < u \leqq 0.2$ *based on the sum of said at least one element and Fe, having a coercive force (iHc) of at least 4 KOe.*

*32. A permanent magnet formed of a magnetic powder of claims 1 or 34.*

*33. A permanent magnet having a composition of* $((Ce_xLa_{1-x})_yR_{1-y})_z(Fe_{1-u-w}Co_wM_u)_{1-v}B_v]_{1-z}$ *with a proviso of* $0.4 \leqq x \leqq 0.9$, $0.2 < y < 1.0$, $0.05 \leqq z \leqq 0.3$, $0.01 \leqq v \leqq 0.3$, $0 \leqq u \leqq 0.2$, $0 \leqq w \leqq 0.5$, *and M is at least one element selected from the group consisting of Al, Ti, V, Cr, Mn, Zr, Hf, Nb, Ta, Mo, Ge, Sb, Sn, Bi, Ni, W, Cu, and Ag having a coercive force (IiHc) of at least 4 kOe, comprising a rapidly cooled magnetic material which has been plastically worked.*

*34. A permanent magnetic powder or ribbon obtained by a rapid cooling method having a composition of* $((Ce_xLa_{1-x})_yR_{1-y})_z(Fe_{1-v}B_v)_{1-z}$, *wherein R is at least one rare earth element except for Ce and La but including Y with a proviso of* $0.4 \leqq x \leqq 0.9$, $0.2 < y < 1.0$, $0.5 \leqq z \leqq 0.3$, $0.01 \leqq v \leqq 0.3$, *and having a coercive force (iHc) of at least 4 KOe.*

* * * * *